US008819639B2

(12) United States Patent
Schumacher

(10) Patent No.: US 8,819,639 B2
(45) Date of Patent: Aug. 26, 2014

(54) SYSTEM FOR SELECTIVELY BLOCKING EXECUTION OF APPLICATIONS ON A COMPUTER SYSTEM

(75) Inventor: Michael K. Schumacher, Orchard Lake, MI (US)

(73) Assignee: Lakeside Software, Inc., Bloomfield Hills, MI (US)

( * ) Notice: Subject to any disclaimer, the term of this patent is extended or adjusted under 35 U.S.C. 154(b) by 2440 days.

(21) Appl. No.: 10/941,725

(22) Filed: Sep. 15, 2004

(65) Prior Publication Data
US 2006/0059469 A1 Mar. 16, 2006

(51) Int. Cl.
*G06F 9/44* (2006.01)
*G06F 9/445* (2006.01)
*G06F 21/51* (2013.01)

(52) U.S. Cl.
CPC ............... *G06F 21/51* (2013.01); *G06F 9/445* (2013.01)
USPC ............ 717/127; 717/120; 717/126; 717/174

(58) Field of Classification Search
CPC ....... G06F 8/71; G06F 21/51; G06F 9/44589; G06F 9/445; G06F 11/3466
USPC .............................. 713/100; 717/118; 704/201
See application file for complete search history.

(56) References Cited

U.S. PATENT DOCUMENTS

| | | | |
|---|---|---|---|
| 6,021,438 A * | 2/2000 | Duvvoori et al. | 709/224 |
| 6,052,788 A * | 4/2000 | Wesinger et al. | 726/11 |
| 6,167,522 A * | 12/2000 | Lee et al. | 726/2 |
| 6,275,938 B1 * | 8/2001 | Bond et al. | 726/23 |
| 6,658,651 B2 * | 12/2003 | O'Brien et al. | 717/127 |
| 6,988,262 B1 * | 1/2006 | Mallory et al. | 717/127 |
| 7,484,207 B2 * | 1/2009 | Sato | 717/174 |
| 2002/0040470 A1 * | 4/2002 | Guthrie et al. | 717/126 |
| 2002/0107809 A1 * | 8/2002 | Biddle et al. | 705/59 |
| 2003/0131094 A1 * | 7/2003 | Awada et al. | 709/224 |
| 2004/0060038 A1 * | 3/2004 | Johnston-Watt et al. | 717/120 |
| 2005/0204345 A1 * | 9/2005 | Rivera et al. | 717/127 |
| 2005/0262083 A1 * | 11/2005 | Brown | 707/9 |
| 2007/0050301 A1 * | 3/2007 | Johnson | 705/59 |

OTHER PUBLICATIONS

Suh et al., AEGIS: architecture for tamper-evident and tamper-resistant processing, Jun. 2003, 12 pages.*
Reid et al., DRM, trusted computing and operating system architecture, Jan. 2005, 10 pages.*
Web page http://www.comptechdoc.org/os/windows/win2k/win2kgpolicies.html dated Jun. 7, 2004 regarding "Windows 2000 Group Policies".

(Continued)

*Primary Examiner* — Thuy Dao
(74) *Attorney, Agent, or Firm* — Dykema Gossett PLLC

(57) ABSTRACT

The system for selectively blocking execution of applications on a computer system includes an interface that allows an administrator to set configuration settings and which includes tools that assist the administrator in establishing an application list. The application list specifies zero or more applications that are to be either blocked or that are to be allowed to run (i.e., all others to be blocked), depending on the selected configuration settings. The tools include a mechanism that automatically creates a historical database of applications that have been executed in the past on the computer system. The interface allows easy selection of applications from the historical database for inclusion on the application list.

47 Claims, 3 Drawing Sheets

(56) References Cited

OTHER PUBLICATIONS

Web page http://www.softwaremetering.com/_metering.htm dated Jun. 7, 2004 regarding "SofTrack Software Metering".

Software Metering Report: SofTrack versus SMS 2003 prepared Aug. 2003, Integrity Software, Inc.
McAfee VirusScan Home Edition User Guide.

* cited by examiner

SYSTEM FOR SELECTIVELY BLOCKING EXECUTION OF APPLICATIONS ON A COMPUTER SYSTEM

TECHNICAL FIELD

The present invention relates generally to computing systems and, more particularly, to a system and method for selectively blocking execution of applications on a computer system.

BACKGROUND OF THE INVENTION

In the field of computing systems, it is known to provide various mechanisms for suppressing execution of program files, scripts and the like. For example, it is known to provide anti-virus software that is configured to scan a program file, script or the like for the presence of a computer virus, and, if present, to (i) attempt cleansing of the file, and if successful permit execution of the file; (ii) quarantine the infected file until the user decides what course of action to take; or (iii) deletion of the file. However, in every instance, the foregoing actions depend on the anti-virus software recognizing the file as being infected by a computer virus. Accordingly, anti-virus software is limited in its usefulness in blocking execution of programs that may not be infected, but for which there is a desire to block execution nonetheless (e.g., an employer may wish to prevent users from running a web browser). Additionally, such anti-virus programs depend on having up-to-date definitions of virus signatures, and may be ineffective at blocking newly released viruses.

Another attempt in the art to suppress execution of program files involves license metering programs. These programs typically operate by replacing the metered executable with a stub configured to consult a server to determine the number of running copies. Such metering programs then suppress (i.e., prevent) execution when the number of licensed copies is reached. The use of stubs, however, has limited utility for certain types of executable files, for example, e-mail attachments, executable program files on network-attached storage or servers and the like. That is, the use of the stub does not work on all executable files irrespective of the mechanism through which they are executed. This approach has the further downside of requiring disruptive changes to the applications involved.

Yet another attempt in the art to restrict program execution involves Microsoft Windows Domain Policy rules. These rules allow a user to specify which program files to block, but requires that the names of such program files be known in advance. This approach is tedious. Additionally, Domain Policy rules do not provide a way to build a permitted application list, so it is difficult for the user to specify which programs should be allowed to execute on a "locked" system.

Still yet another approach taken in the art for blocking execution of applications involves the use of file-level permissions. File permissions can be manipulated to alter its system security attributes of the executable file. However, as with the Domain Policy rules, this approach requires a priori knowledge of the both the files and the installation locations and hence has the same limitations. Moreover, such an approach is of limited or no value for executables on a network or file server storage, as well as e-mail attachments (i.e., because one cannot set the file attributes in advance for files becoming available through those channels). Finally, this approach is ineffective at blocking applications from being used by users that have a high level of permission on the system.

There is therefore a need for an improved system and method for selectively blocking execution of program files on a computer system that minimizes or eliminates one or more of the shortcomings as set forth above.

SUMMARY OF THE INVENTION

One object of the invention is to provide a solution to one or more of the shortcomings set forth in the Background. The present invention, in its several embodiments, has several advantages. One advantage is its ease and accuracy in allowing a user, such as an administrator, in specifying which applications are to be blocked, or which applications are allowed to execute. Another advantage of the present invention is that it can prevent execution of undesired program files without requiring any a priori knowledge of the program files to be blocked.

These and other objects, features and advantages of the present invention may be achieved through a method of operating a computer. The method includes the step of tracking program files executed on the computer to thereby establish a historical database. The method further includes the step of providing a user interface configured to allow the selection of desired program files drawn from the historical database for inclusion on an application list. The application list defines designated program files that are permitted to execute on the computer. Finally, the basic method involves the step of detecting when a candidate program file has started execution on the computer and evaluating whether the candidate program file is allowed to continue to execute. In one embodiment, the method further includes the step of allowing continued execution of the candidate program file when file attributes associated with the candidate program file match attributes specified in the application list. Alternatively, the method further comprises the step of discontinuing execution of the candidate program file when file attributes associated with the candidate program file vary from attributes specified in the application list. The foregoing method pertains to an embodiment of the invention where the application list specifies program files that are permitted to execute on the computer. However, in alternate embodiments, the application list defines designated program files that are not permitted to execute on the computer.

Other methods and systems according to the present invention are presented.

These and other features and objects of this invention will become apparent to one skilled in the art from the following detailed description and the accompanying drawings illustrating features of this invention by way of example.

BRIEF DESCRIPTION OF THE DRAWINGS

The present invention will now be described by way of example, with reference to the accompanying drawings.

DETAILED DESCRIPTION OF THE PREFERRED EMBODIMENT

Figure 1:
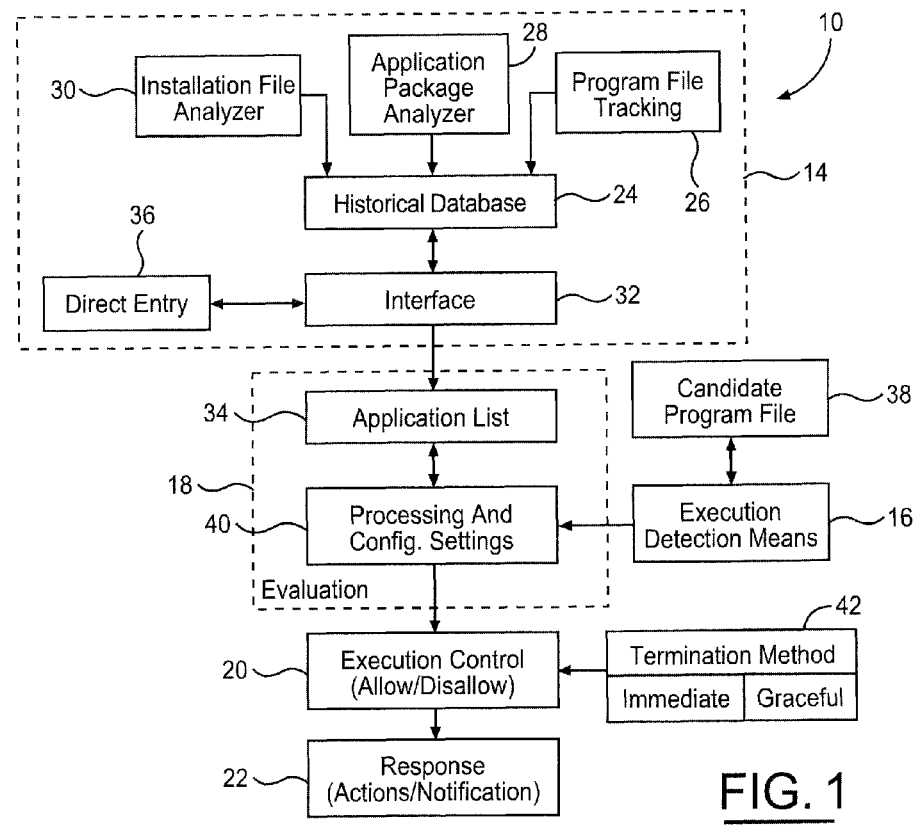
FIG. 1 is a simplified block diagram view of a system for selectively blocking execution of a candidate program file.

Referring now to the drawings wherein like reference numerals are used to identify identical components in the various views, FIG. 1 is a high-level block diagram showing a system 10 for selectively suppressing or blocking execution of a candidate program file (i.e., an executable). It should be understood that as used in this application, candidate program file means any file type that can execute or direct execution on a computer, including but not limited to binary executables, scripts, etc. System 10 is configured to overcome, in its various embodiments, the limitations of the prior art as set forth in the Background. As a first example, many organizations wish to restrict the applications (i.e., a collection of one or more program files) that may be executed on their computing equipment to those on a particular authorized application list. This may be desirable, for example, due to either software licensing considerations or due to a desire to increase responsible use of the organization's computing equipment. Secondly, many organizations are increasingly plagued with computer viruses and other mal-intentioned software that may be introduced through e-mail, the Internet or through other means. Organizations, accordingly, wish to block or suppress the execution of such software to minimize service disruptions and security threats, among other things.

With continued reference to FIG. 1, system 10 is configured to run on a conventional computer 12 (best shown and described in connection with FIG. 5), to perform the function of suppressing or blocking execution of an executable, referred to herein as the candidate program file. System 10 includes a means or mechanism 14 for establishing an application list, a means or mechanism 16 for detecting when the candidate program file has started execution, a means or mechanism 18 for evaluating whether the candidate program file should be blocked, a means or mechanism 20 for thereafter controlling execution of the candidate program file, and a means or mechanism 22 for generating a response (e.g., generate an action or a notification).

It should be understood that the foregoing means or mechanisms are preferably implemented as programmed functions on a general purposes computer, such as computer 12. In this regard, the processor, memory, etc. in combination with the programmed instruction for the corresponding structure is a preferred embodiment.

With continued reference to FIG. 1, means or mechanism 14 is provided for establishing an application list, designated by reference numeral 34. The application list specifies zero or more program files that can be allowed to execute or disallowed to execute, based on a list mode parameter (more on this below), which can be set to an ALLOWED mode or a DISALLOWED mode. When the list mode parameter is set to ALLOWED, the program files specified in the application list 34 are permitted to execute on computer 12 while when the list mode parameter is set to DISALLOWED, the program files specified in the application list 34 are not permitted to execute on the computer 12 (i.e., the other program files thus being allowed to execute). Application list establishing means 14 includes a historical database 24, a program tracking mechanism 26, an application package analyzer 28, an installation file analyzer 30 and a user (e.g., administrator's) interface 32, including a direct entry mechanism 36.

Historical database 24 is a data structure for listing certain applications (i.e., program files) and forms part of tool set that can assist a user in populating the application list 34. One limitation of the prior art mechanisms for suppressing execution of program files is the tedious requirement that each program files be spelled out separately and distinctly. With today's sophisticated application packages containing numerous executables, identifying and listing all the program files associated with just one application package is an enormous undertaking, making it quite difficult for even sophisticated and patient users to establish a complete list. It is frequently difficult to determine which functions are performed by each of the individual executables included with an application package, and it is therefore difficult to manually decide which ones provide desired functionality and which ones contain functionality to be suppressed. This can lead to incomplete and inaccurate listing of all the files needed to be blocked resulting in an ineffective application blocking function. In accordance with the present invention, historical database 24 can be consulted when a user wishes to create application list 34.

Historical database 24 may be automatically populated by the present invention from three main sources: (1) the tracking of application packages that have executed on computer 12; (2) the analysis of installed application packages; and (3) the analysis of installation files for installed application packages.

Program tracking mechanism 26 is configured to automatically track application packages, and accordingly the constituent program files thereof that have executed on computer 12, and record or log the name of the tracked program file, the folder from which is was launched as well as other attributes in the historical database 24. For example, a user utilizing an embodiment of the present invention may install it on a "model" computer system, and run those application packages as would normally be authorized. The tracking mechanism would then operate to log the program files associated with the executed application packages in the historical database 24.

Application package analyzer 28 is configured to determine sets of program files associated with application packages installed on computer 12 by examining the hard drive or other storage associated with computer 12 that holds such executables. Analyzer 28 is further configured to transfer these sets of program files, particularly as the listing of the constituent program files associated with the application packages specifying the file name, the pathname or folder in which the file is properly installed, and other attributes to the historical database 24.

Installation file analyzer 30 is configured to determine sets of program files associated with application packages installed on computer 12 by examining installation scripts and the like. Analyzer 30 is further configured to transfer these sets of programs files, particularly the information regarding the file names, the pathnames or folder in which the file is properly installed, and other attributes, to the historical database 24.

Interface 32 is configured to allow the user to select desired program files drawn from the historical database 24 for inclusion on the application list 34. Interface 32 is further configured to include a direct entry means 36 for allowing direct entry of a desired program file for inclusion in the application list 34. Through the foregoing, when a user wishes to establish an application list 34 (or supplement or change an existing list 34), the user can choose program file names from the historical database or directly enter the names of the program files. This is an important feature of the present invention, inasmuch as it substantially eases the burden of establishing the application list 34 as well as improves the accuracy and completeness of the entries in the application list 34.

As an example, assume the system 10 is set up such that the list mode is set to the ALLOWED mode wherein the application list specifies only those applications that can execute. By implication, all other program files are blocked (with exceptions noted below such as critical operating system executable files). An administrator can take a clean, known computer, install the present invention, and run just those applications he/she wishes the end-users to have access to. The tracking mechanism 26 will log these program files in the historical database 24. Through the interface 32, the administrator can make selections easily, accurately and completely, via reference to the historical database, for inclusion on the application list 34. Now, only the desired applications will execute. All others, including computer viruses and other mal-intentioned pieces of software, from whatever source, will be blocked. They will be blocked even without a priori knowledge of the identity of the program files and even without any sort of analysis as to such files (e.g., looking for a virus). This is a significant departure from the prior art described in the Background.

Detecting means 16 is configured to detect when a candidate program file 38 has started execution on computer 12, and to additionally provide to evaluating means 18 the following: the filename, the folder or pathname from which the program file is being launched, and other file attributes. Detecting means 16 is shown in communication with the candidate program file 38. Detecting means 16 may comprise conventional techniques known to those of ordinary skill in the software art, and as such will not be elaborated upon further in this application.

Evaluating means 18 is provided for evaluating, when a candidate program file starts execution as detected by detecting means 16, whether to allow or disallow continued execution of that candidate program file. Evaluating means 18 performs the analysis based on the contents of the application list 34 and the status of a plurality of configuration settings (to be described in greater detail in connection with FIG. 2). Evaluating means 18 includes the application list 34 and a processing and configuration settings block 40 ("processing block 40"). There are two basic modes of operation for the present invention: an ALLOWED mode and a DISALLOWED mode. Processing block 40 is configured such that when in the ALLOWED mode of operation, if the candidate program file 38 is on the application list 34, it is allowed to continue to execute, while if it is not on the list, continued execution will be blocked. On the other hand, when processing block 40 is configured to operate in the DISALLOWED mode of operation, and the candidate program file is on the application list 34, continued execution will be blocked. Conversely, when it is not on the application list 34 (i.e., now conditioned to be a disallowed list), the candidate program file 38 is allowed to continue to execute. The decision as to whether to allow or block execution is output by processing block 40 and is provided to execution control 20.

As to implementation, in one embodiment, the processing block 40 itself executes as a thread that is started in the context of the newly started candidate program file 38. However, in alternate embodiments, processing block 40 may itself be executed outside the context of the newly executed candidate program file 38.

With continued reference to FIG. 1, execution control means 20 is provided for selectively controlling execution of the candidate program file 38, in response to the output of processing block 40, and in accordance with a selected termination method 42. The options under termination method 42 include an immediate termination option or a graceful exit option. If the selected termination method calls from a graceful exit, execution control means 20 will cause a request to be sent to and through the operating system asking the candidate program file to terminate. If the termination method calls for immediate termination, then execution control means 20 will terminate the execution of the candidate program file 38 immediately. Techniques for generating a request that an executing program file shut down and for generating an immediate kill request are well know to those of ordinary skill in the art, and will not be further elaborated upon herein.

Response means 22 performs a function in the nature of a reporting mechanism, and is provided for producing a response, for example either taking an action or generating a notification as a result of the control imposed by execution control mechanism 20. In one embodiment, the response mechanism 22 may include a database (not shown) for allowing a reporting interface to record a response for later retrieval/review, a log file, an interface to the system event log, an e-mail interface for specifying one or more (i.e., a list) of e-mail addresses to which notifications are made, a Simple Network Monitoring Protocol (SNMP) interface, as well as other notification mechanisms. Response mechanism 22 is configured to allow selection of zero or more notifications from the group comprising an e-mail message, a simple network monitoring protocol (SNMP) message, a telecommunications page, a visual notification on a display associated with a computer, an audio notification, and a combination of any of the foregoing notifications. The response mechanism 22 is also configured to allow the user to select an action from the group comprising no action, running a program or script, rebooting the computer and a combination of any of the foregoing actions. Of course, other responses, either in the nature of a notification or an action, may be included and remain within the spirit and scope of the present invention.

Figure 2:
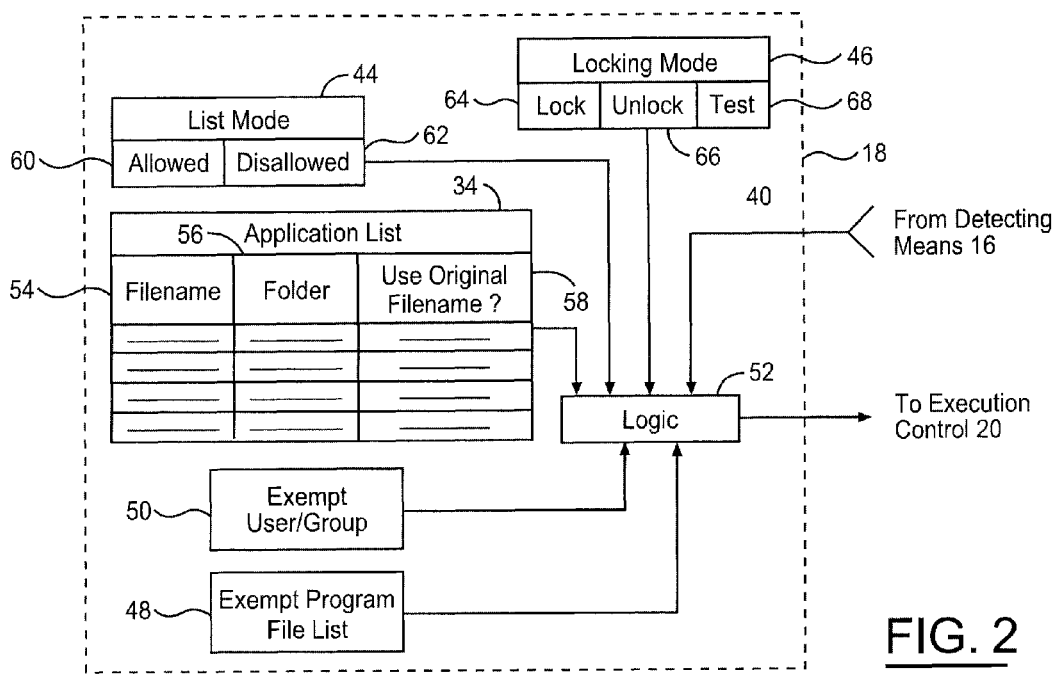
FIG. 2 is a simplified block diagram showing, in greater detail, an evaluation mechanism shown in block form in FIG. 1.

FIG. 2 is a high-level block diagram showing, in greater detail, evaluation means 18 of FIG. 1. FIG. 2 further shows various configuration settings as set forth above, including a list mode parameter 44, a locking mode parameter 46, an exempt program file list 48, an exempt user/group parameter 50 and programmed logic block 52. A user, typically an administrator, specifies the configuration of system 10 by selecting settings for each of the parameters noted above.

With continued reference to FIG. 2, list mode parameter 44 has two mode settings corresponding to an ALLOWED mode of operation, designated 60, and a DISALLOWED mode of operation, designated 62. The list mode indicates whether the application list 34 specifies program files that are allowed to run (i.e., the ALLOWED mode) or whether it specifies program files that are not permitted to run (i.e., the DISALLOWED mode).

The locking mode parameter 46 has three mode settings corresponding to a locked mode of operation, designated 64, an unlocked mode of operation, designated 66, and a test mode of operation, designated 68. When the locking mode parameter 46 has been set to "unlocked", all program files are allowed to run on computer 12. When the locking mode parameter 46 has been set to "test", notifications are sent and actions are taken (see below), but disallowed program files whose execution would otherwise be terminated are allowed to continue to execute. When the locking mode parameter 46 is "locked" the operation is of computer 12 as described herein (i.e., program files can be blocked or allowed depending on the list mode and whether they are specified in the application list).

The operating system of computer 12 typically includes a large number of program files that are required to run to operate the system. The present invention is configured to automatically determine the numerous "built-in" list of executables that are part of the operating system. These program files (executables), as specified in the exempt program file list 48, are never blocked. This helps to prevent misconfiguration that could result in the system failing to boot.

Exempt user/group(s) 50 contains a list specifying zero or more groups designated in the operating system of computer 12. Users who are a member of at least one of the specified groups may run any program. Accordingly, such users would be considered "exempt" from any restrictions or limitations that would otherwise obtain due operation of the present invention. This capability is often desirable to support effective administration of the system by system administrators.

Application list 34, as described above, specifies zero or more program files that either are allowed to execute or are disallowed to execute, based on the selected list mode parameter 44. As shown in FIG. 2, application list 34 particularly includes, for each program file, a filename attribute 54, a required folder or pathname attribute 56 as well as other attributes, such as an Original Filename attribute 58. The folder attribute 56 specifies the folder from which the candidate program file 38 must be launched in order to be deemed to match the corresponding row in the application list 34. The original filename attribute 58 specifies whether the original filename attribute of the candidate program file 38 should be checked in order to qualify the candidate program file relative to the application list. Through the use of original filename attribute 58, the present invention can prevent renamed program files from executing. It should be clearly understood that the attributes shown in application list 34 in FIG. 2 are exemplary only and not limiting in nature. Other file attributes known to those of ordinary skill in the art may be used in implementing alternate embodiments and yet remain within the spirit and scope of the present invention.

Logic 52 is, in a software-based embodiment, implemented using programmed routines consistent with the functionality described herein. Logic 52 is configured to process the input data regarding the candidate program file 38 and determine whether that candidate program file 38 should be allowed to execute.

Figure 3:
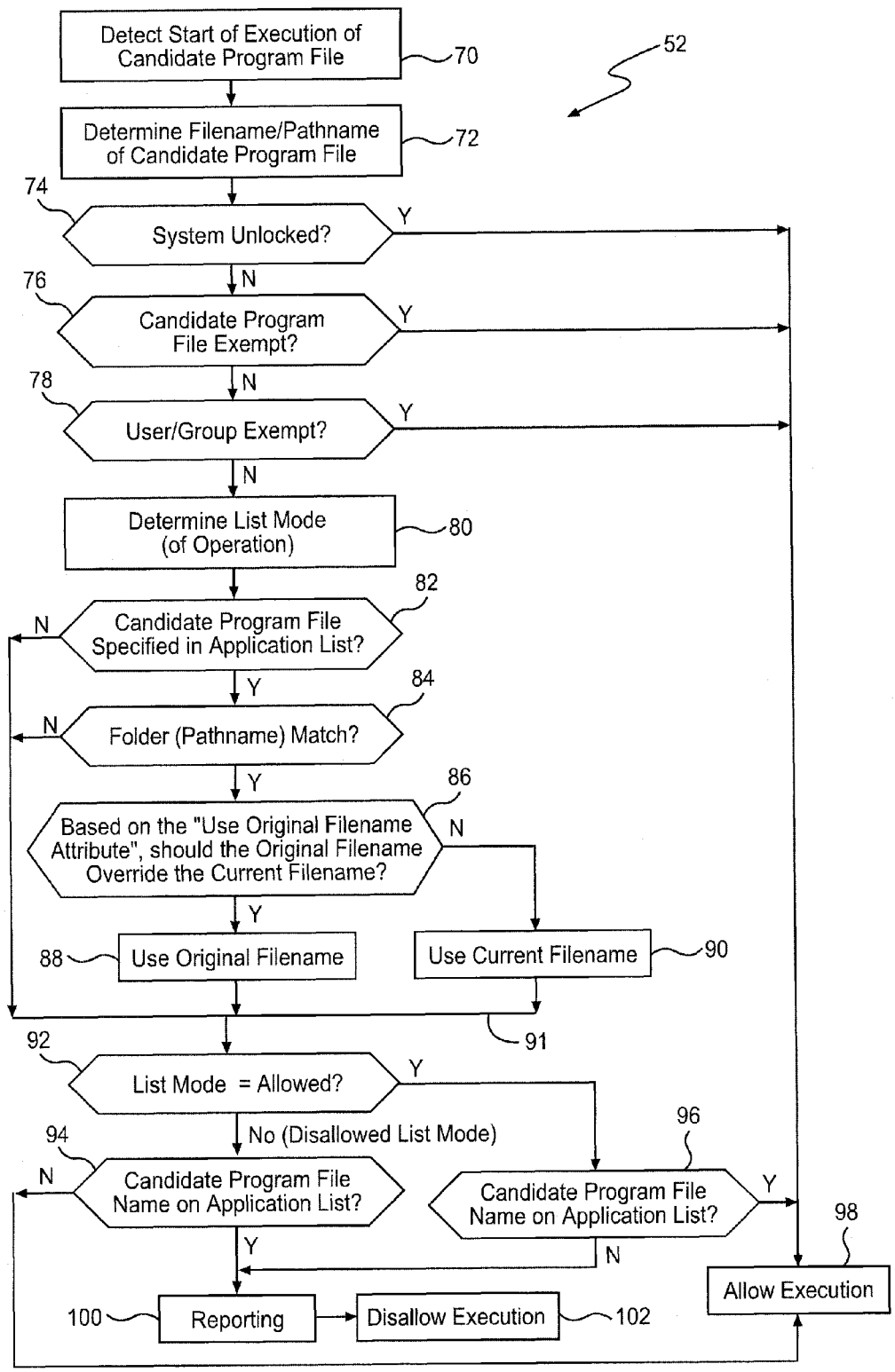
FIG. 3 is a flow chart diagram illustrating a process for implementing the evaluation mechanism of FIG. 2.

FIG. 3 is a flowchart diagram showing, in greater detail, the method performed by programmed logic block 52 in FIG. 2. The method begins in step 70.

In step 70, the method detects, using execution detection means 16, when a candidate program file 38 starts execution on computer 12. The method then proceeds to step 72.

In step 72, the method determines both the filename and pathname (i.e., folder) of the candidate program file 38. This function is straightforward using conventional techniques known to those of ordinary skill in the art. In one embodiment, such functionality may be included in execution detection means 16. The method then proceeds to decision block 74.

In decision block 74, the method determines whether system 10 is "Unlocked" (i.e., whether the locking mode parameter 46 is set to the "unlocked" mode 66). If the answer is YES, then the method branches to step 98, which is to allow execution of the candidate program file 38. Otherwise, if the answer is NO, then the method branches to decision block 76.

In decision block 76, the method determines whether the candidate program file 38 is exempt, that is, is on the exempt program file list 48 (best shown in FIG. 2). This list specifies the list of operating system executables and such executables are never blocked. If the answer is YES, then the method branches to step 98, which is to allow execution of the candidate program file. Otherwise, if the answer is NO, then the method branches to decision block 78.

In decision block 78, the method determines whether the user that initiated execution of the candidate program file 38 is a member of at least one of the group(s) specified in the exempt group list 50. This function may be performed using conventional techniques known to those of ordinary skill in the art. For example, this function may be performed in two steps. First, determine the identity of the user that initiated execution. Second, determine if the identified user is a member of at least one of the groups on list 50. If the answer is YES, then the method branches to step 98, which is to allow execution of the candidate program file 38. Otherwise, if the answer is NO, then the method branches to step 80.

In step 80, the method determines to which list mode parameter the system 10 is set (i.e., either to the ALLOWED mode of operation or to the DISALLOWED mode of operation). The method then proceeds to decision block 82.

In decision block 82, the method determines whether the candidate program file 38 for which execution has just started is specified in the application list 34. This function may be performed by a comparison of the filename of the candidate program file 38 with the entries in application list 34. If the answer is YES, then the method branches to decision block 84. Otherwise, if the answer is NO, then the method branches to a common point 91, destined for decision block 92.

In decision block 84, the method determines whether the pathname (e.g., the folder name) from which the candidate program file 38 was launched matches the pathname (folder) field in the corresponding entry in application list 34. If the answer is YES, then the method branches to decision block 86. Otherwise, if the answer is NO, then the method branches to common point 91, destined for decision block 92. In this regard, the candidate program file is deemed not to be on the application list 34.

In decision block 86, the method performs, if appropriately configured, a test in order to detect renamed copies of program files. In connection with this function, if specified, the present invention examines the internal version resource of the candidate program file to determine the original file name from which the file was copied (if applicable). If the original filename can be determined, and it is different than the current filename of the candidate program file, then the original filename is used in preference to the current filename for the remainder of the operation. Before this occurs, however, the method is configured to check the "Use Original Filename" parameter 58 in application list 34 to determine whether the original filename should override the current filename (i.e., whether the administrator has configured system 10 for such operation). If the answer is YES, then the method branches to step 88, wherein the method is configured to use the original filename for the remainder of the operation. However, if the answer is NO, then the method branches to step 90, wherein the method is configured to use the current filename for the remainder of the operation. Step 90 is also performed if the original filename is unavailable or cannot be determined. In either event, the method proceeds to common point 91, destined for decision block 92.

Decision blocks 92, 94 and 96 collectively evaluate whether the candidate program file should be blocked or whether it should be allowed to execute in view of the selected list mode of operation. In decision block 92, the method determines whether the list mode parameter 44 corresponds to the ALLOWED mode of operation. If YES, then the method branches to decision block 96. Otherwise, if the answer is NO (meaning that the list mode corresponds to the DISALLOWED mode of operation), then the method branches to decision block 94.

In decision block 94, the method determines whether the candidate program file is "on" the application list 34. If the answer is NO, then the method branches to step 98, which is to allow execution. Otherwise, if the answer is YES, then the method branches to step 100. In this regard, "on" the list means at least some level of match (e.g., filename and folder) between the attributes of the candidate program file and the attributes of at least one entry in the application list. Conversely, not "on" the list means at least that the attributes of the candidate program file vary from the attributes in the application list.

In decision block 96, the method determines whether the candidate program file is "on" the application list 34. If the answer is YES, then the method branches to step 98, which is to allow execution. Otherwise, if the answer is NO, then the method branches to step 100.

In step 100, the method performs a reporting function, which in one embodiment may include at least one of an action to be taken or a notification to be made, all as selected by the user. This step will be described in greater detail in connection with the flowchart of FIG. 4. The method proceeds to step 102.

In step 102, the method is operative to disallow (or discontinue) execution of the candidate program file 38. The method may terminate the execution of the program file either (1) immediately or (2) using a graceful exit, all as described above in connection with termination parameter 42 in FIG. 1.

Figure 4:
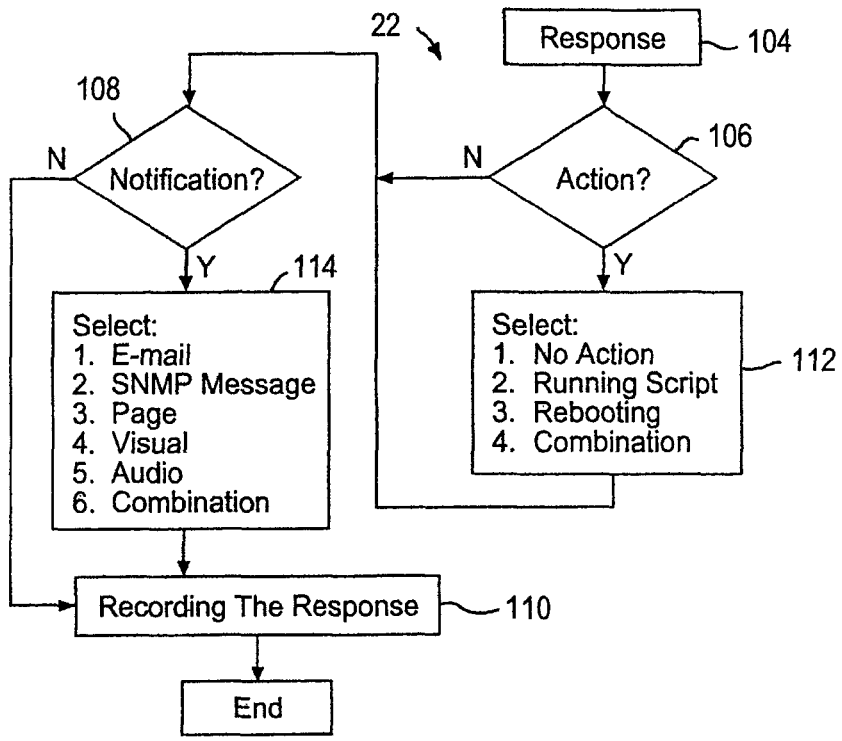
FIG. 4 is a flow chart diagram illustrating a reporting method processed when execution of a candidate program file has been blocked.

FIG. 4 is high-level flowchart diagram showing, in greater detail, the response or reporting function illustrated in block form in FIGS. 1 and 3. This detailed flowchart starts with step 104, which assumes a response (action or notification) has been specified by the user, and then proceeds to a decision step 106.

In step 106, the method determines whether the specified response(s) is an action. If the answer to decision block 106 is YES, then the method branches to step 112.

In step 112, the method selects one or more of the specified actions and executes them. These actions may include "no action", running a program or script for performing additional functions, rebooting the computer or any combination of the above. The method then proceeds to step 108.

Step 108 also accepts the flow of control when the answer in the decision block 106 is "NO." In step 108, the method determines whether the specified response(s) includes a notification. If "YES," then the method branches to step 114.

In step 114, the method selects one or more of the specified notifications and executes them. These may include sending a notification as to the blocked execution of a program file in the form of an e-message to one or more e-mail addresses specified in a list, an SNMP message, a telecommunications page, a visual or audio message, or any combination of the above.

Upon completion of step 114, the method branches to step 110, which is to record the response in a log file or the like.

If the answer to decision block 108 is "NO," then the method branches to the recording the response block 110 (i.e., there may be an "action" to log, or to log that no action or notification was ordered or completed). The method then proceeds to an "end" block from step 110.

Figure 5:
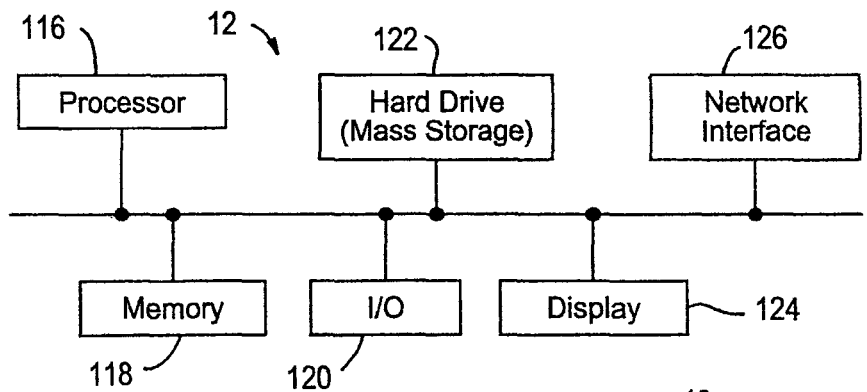
FIG. 5 is a high-level block diagram of an exemplary computer system on which the presented invention may be implemented.

FIG. 5 is a high level block diagram of an exemplary computer 12 on which the present invention may be implemented. Computer 12, as shown, may include a central processor 116, a main memory 118, an input/output block 120, non-volatile memory such as a hard disk drive (mass storage) 122, a visual display 124 and a network interface 126, all interconnected in a known fashion by conventional busses.

Main memory 118 may be employed to store instructions and data suitable for implementation of the present invention, in accordance with the enabling disclosure provided herein. The input/output block 120 may be operative to interface with a conventional mouse for aiding input/selection, as described herein. I/O block 120 may also include audio reproduction apparatus to allow for an audio report, as described above in connection with FIG. 4. In addition, computer 12 may comprise any conventional computing system software, and, in one embodiment, may comprise a Microsoft Windows-based computer operating system. It should be understood, however, that the present invention is not so limited. Computer 12 may be based on other widely available operating systems, such as, but not limited to, Unix-based systems, Linux-based systems, and Apple Macintosh-based systems.

Figure 6:
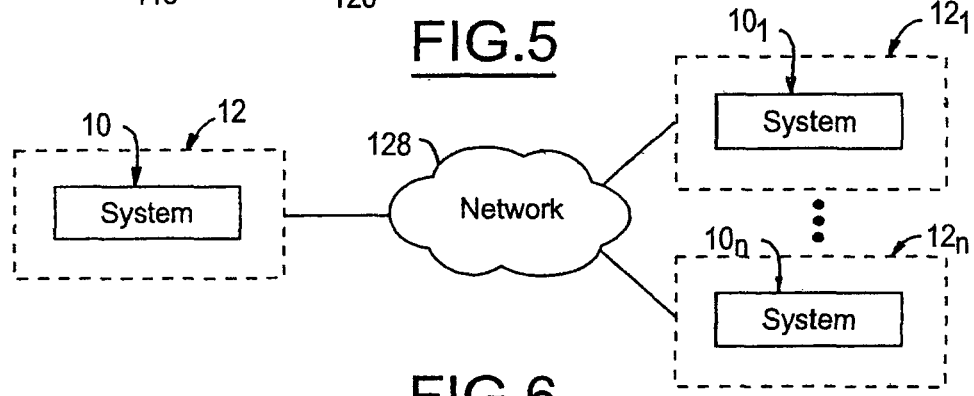
FIG. 6 is a high-level block diagram showing an embodiment of the present invention implemented over a network.

FIG. 6 shows an alternate, distributed computing embodiment of the present invention operating over a network. For example, where computer 12 is a local computer, FIG. 6 shows remote computers $12_1, 12_2, \ldots 12_n$ each having system 10. The local and remote computers are in communication with each other over a network 128. In this alternate embodiment, an application list 34 may reside on computer 12 (local) while the controlled computers (e.g., the blocking or allowance of execution of program files) $12_1, 12_2, \ldots 12_n$ are so controlled over network 128. Network 128 may comprise any kind of communication network now known or hereafter developed, including without limitation a local area network, a wide area network, the Internet, or network.

It should be understood that the functions and methodologies may be performed through appropriate programming of computer 12 using conventional programming tools known to those of ordinary skill in the art. Accordingly, the computer 12 configured by way of programming constitutes the structure corresponding to the recited functions in the apparatus claims. Other structures, however, are contemplated including without limitation electronic hardware, including computer hardware suitably configured to perform the functions recited in the claims. Additionally, the present invention, in a software-based embodiment, may be resident on a computer-readable medium, such as a CD-ROM, a DVD, a diskette, a FLASH memory (solid-state) or other removable means of storage now known or hereafter developed. Such medium, when coupled to a computer and the software-based embodiment that is resident thereon is hooked into the computer memory, is configured to perform the methodologies of the invention described in this application. Applicant considers this feature to be within the spirit and scope of the present invention.

It is also to be understood that the above description is merely exemplary rather than limiting in nature, the invention being limited only by the appended claims. Various modifications and changes may be made thereto by one of ordinary skill in the art which embody the principles of the invention and fall within the spirit and scope thereof

The invention claimed is:

1. A method of operating a computer comprising the steps of:
   (A) tracking program files executed on the computer to thereby establish a historical database wherein the database lists program files that have executed on the computer;
   (B) using the historical database to create an application list wherein the application list defines designated program files that are permitted to execute on the computer;
   (C) detecting when a candidate program file has started execution on the computer through a detecting means independent of the candidate program file and evaluating, using the application list, whether the candidate program file is allowed to continue to execute on the computer.

2. The method of claim 1 further comprising the step of: allowing continued execution of the candidate program file when file attributes associated with the candidate program file match attributes specified in the application list.

3. The method of claim 1 further comprising the step of: discontinuing execution of the candidate program file when the evaluation from step (C) indicates that the candidate program file should not be allowed to continue to execute on the computer wherein said step of discontinuing execution includes causing a request to be sent to and through an operating system of the computer.

4. The method of claim 3 wherein said step of discontinuing execution of the candidate program file includes the substep of determining when file attributes associated with the candidate program file vary from attributes specified in the application list.

5. The method of claim 3 wherein said step of discontinuing execution includes the substep of:
immediately terminating the candidate program file when a termination parameter is set to force an immediate program file termination.

6. The method of claim 3 wherein said step of discontinuing execution includes the substep of:
forming the request so as to terminate execution of the candidate program file when a termination parameter is set to a graceful exit option.

7. The method of claim 1 further including the step of: producing a response when file attributes associated with the candidate program file vary from attributes specified in the application list.

8. The method of claim 7 further including the step of: selecting the response from one of an action and a notification.

9. The method of claim 8 wherein the selected response is an action, said method further comprising the step of:
selecting the action from the group comprising running a program or script, rebooting the computer on which the program is executing and a combination of any of the foregoing actions.

10. The method of claim 8 wherein the selected response is a notification, said method further comprising the step of:
selecting the notification from the group comprising an e-mail message, a simple network monitoring protocol (SNMP) message, a telecommunications page, a visual notification on a management console or on the computer on which the program is executing, an audio notification on a management console or on the computer on which the program is executing, and a combination of any of the foregoing notifications.

11. The method of claim 7 further including the step of: recording the response.

12. The method of claim 1 wherein said tracking step comprises the sub step of:
recording file attributes, including a respective filename and pathname, of each tracked program file in the historical database.

13. The method of claim 1 wherein the application list includes an original filename parameter whose value indicates whether an original filename of a candidate program file should be evaluated.

14. The method of claim 1 further comprising the step of: analyzing installed application packages for constituent program files and recording the constituent program files in the historical database.

15. The method of claim 1 further comprising the step of: analyzing installation files associated with installed application packages so as to determine constituent program files and recording the constituent program files in the historical database.

16. The method of claim 1 further comprising the step of: establishing an exempt program file list defining constituent program files associated with an operating system (OS) of the computer;
detecting when the candidate program file is on the exempt program file list and allowing continued execution thereof.

17. The method of claim 1 further comprising the step of: establishing an exempt user list defining one or more users or groups whose members are users of the computer;
detecting when a user of the computer is on the exempt-user list and allowing continued execution of the candidate program file.

18. The method of claim 1 wherein said step of providing a user interface includes the substep of:
configuring the user interface to allow direct entry of desired program files for inclusion on the application list.

19. The method of claim 1 wherein the evaluation from step (C) includes evaluating one of a folder/pathname attribute or a filename attribute of the candidate program file wherein the filename attribute includes one of an original filename and a current filename.

20. The method of claim 1 wherein the evaluation from step (C) includes evaluating, using an exempt program list, whether the candidate program file is allowed to continue to execute on the computer.

21. A method of operating a computer comprising the steps of:
(A) establishing an application list defining designated program files;
(B) determining a list mode of operation wherein the determined mode is one of (i) an allowed mode of operation such that the designated program files are permitted to execute on the computer and (ii) a disallowed mode of operation such that the designated program files are blocked from executing on the computer;
(C) detecting when a candidate program file has started execution on the computer through a detecting means that is independent of the candidate program file;
(D) selectively controlling execution of the candidate program file in accordance with the application list and the selected mode of operation for one of continued execution or discontinued execution.

22. The method of claim 21 wherein the list mode of operation is the allowed mode, said step of establishing an application list comprises the substeps of:
tracking program files executed on the computer to thereby establish a historical database;
using the historical database to create an application list wherein the application list defines designated program files that are permitted to execute on the computer.

23. The method of claim 22 further including at least one of the steps of:
analyzing installed application packages for constituent program files and recording the constituent program files in the historical database; and analyzing installation files associated with installed application packages so as to determine constituent program files and recording the constituent program files in the historical database.

24. The method of claim 23 further including the step of configuring a user interface to allow direct entry of desired program files for inclusion on the application list.

25. The method of claim 24 further including the step of:
recording file attributes, including a respective filename and an original filename parameter for each program file in the application list, wherein the original filename parameter indicates whether an original filename of the candidate program file should be used in evaluating whether a match exists with respect to the application list.

26. The method of claim 21 wherein the selected list mode is the allowed mode, said method further comprising the steps of:
allowing continued execution of the candidate program file when file attributes associated with the candidate program file match attributes specified in the application list; and
discontinuing execution of the candidate program file when file attributes associated with the candidate program file vary from attributes specified in the application list.

27. The method of claim 26 wherein said step of discontinuing execution includes the substep of:
immediately terminating the candidate program file when a termination parameter is set to force an immediate program file termination.

28. The method of claim 26 wherein said step of discontinuing execution includes the substep of:
causing a request to be sent to and through an operating system of the computer that the execution of the candidate program file terminate when a termination parameter is set to a graceful exit option.

29. The method of claim 21 wherein the selected list mode is the disallowed mode, said method further comprising the step of:
discontinuing execution of the candidate program file when file attributes associated with the candidate program file match attributes specified in the application list.

30. The method of claim 21 further comprising the steps of:
producing a response when one of either (i) the file attributes associated with the candidate program file vary from attributes specified in the application list and the selected list mode of operation is the allowed mode; or (ii) the file attributes associated with the candidate program file match attributes specified in the application list and the selected list mode is the disallowed mode.

31. The method of claim 30 further including the step of:
selecting the response from one of an action and a notification.

32. The method of claim 31 wherein the selected response is an action, said method further comprising the step of:
selecting the action from the group comprising running a program or script, rebooting the computer on which the program is executing and a combination of any of the foregoing actions.

33. The method of claim 31 wherein the selected response is a notification, said method further comprising the step of:
selecting the notification from the group comprising an e-mail message, a simple network monitoring protocol (SNMP) message, a telecommunications page, a visual notification on a management console or on the computer on which the program is executing, an audio notification on a management console or on the computer on which the program is executing, and a combination of any of the foregoing notifications.

34. A system for blocking execution of a program file on a computer comprising:
a processor;
means configured to execute on the processor for tracking program files executed on the computer to thereby establish a historical database;
means configured to execute on the processor configured to use said historical database to create an application list wherein said application list defines designated program files that are permitted to execute on the computer;
means configured to execute on the processor for detecting when a candidate program file has started execution on the computer that is independent of the candidate program file and evaluating, using the application list, whether the candidate program file is allowed to continue to execute;
means configured to execute on the processor for discontinuing execution of the candidate program file when said evaluation indicates that the candidate program file should not be allowed to continue to execute.

35. The system of claim 34 further comprising:
means for determining file attributes associated with the candidate program file;
means for allowing continued execution of the candidate program file when said file attributes associated with said candidate program file match attributes specified in said application list.

36. The system of claim 34 further comprising:
means for determining file attributes associated with the candidate program file;
means for discontinuing execution of the candidate program file when said file attributes associated with the candidate program file vary from attributes specified in said application list.

37. The system of claim 36 wherein said means for discontinuing execution includes means for immediately terminating the candidate program file when a termination parameter is set to force an immediate program file termination.

38. The system of claim 36 wherein said means for discontinuing execution includes means for causing a request to be sent to and through an operating system of the computer that the execution of the candidate program file terminate when a termination parameter is set to a graceful exit option.

39. The system of claim 36 further including means for producing a response when said file attributes associated with the candidate program file vary from attributes specified in aid application list wherein said response includes one of an action and a notification.

40. The system of claim 39 wherein said action is selected from the group comprising running a program or script, rebooting the computer, and a combination of any of the foregoing actions.

41. The system of claim 39 wherein said notification is selected from the group comprising an e-mail message, a simple network monitoring protocol (SNMP) message, a telecommunications page, a visual notification on a management console or on the computer on which the program is executing, an audio notification, and a combination of any of the foregoing notifications.

42. The system of claim 39 further including means for recording the response.

43. The system of claim 34 wherein said application list includes file attributes, including a respective filename, of each program file, said application list further includes an original filename parameter whose value indicates whether an original filename of said candidate program file should be evaluated.

44. The system of claim 34 further comprising at least one of (i) means for analyzing installed application packages and recording constituent program files in said historical database; and (ii) means for analyzing installation files associated with installed application packages and recording constituent program files in said historical database.

45. The system of claim 34 further comprising means for establishing an exempt program file list defining constituent program files associated with an operating system (OS) of the computer, and means for detecting when the candidate program file is on said exempt program file list and allowing continued execution thereof.

46. The system of claim 34 further comprising means for establishing an exempt user list defining one or more users or groups whose members are users of the computer, and means for detecting when a user of the computer is on the exempt user list and allowing continued execution of the candidate program file.

47. The system of claim 34 wherein said means for creating an application list includes providing a user interface to allow direct entry of desired program files for inclusion on said application list.

* * * * *

UNITED STATES PATENT AND TRADEMARK OFFICE
CERTIFICATE OF CORRECTION

| | | |
|---|---|---|
| PATENT NO. | : 8,819,639 B2 | Page 1 of 1 |
| APPLICATION NO. | : 10/941725 | |
| DATED | : August 26, 2014 | |
| INVENTOR(S) | : Schumacher | |

It is certified that error appears in the above-identified patent and that said Letters Patent is hereby corrected as shown below:

In the Claims:

Column 11, line 59 (Claim 12), "sub step" should be --substep--

Column 14, line 51 (Claim 39), "aid" should be --said--

Signed and Sealed this
Twenty-first Day of October, 2014

Michelle K. Lee
*Deputy Director of the United States Patent and Trademark Office*